US010621247B2

(12) United States Patent
Gonzalez et al.

(10) Patent No.: US 10,621,247 B2
(45) Date of Patent: Apr. 14, 2020

(54) LOCATION AND PROFILE BASED SYSTEM AND SERVICE

(75) Inventors: Francisco Gonzalez, Atlanta, GA (US); Michael Colin Jaccino, Atlanta, GA (US); Yousef Wasef Nijim, Roswell, GA (US); Michael Lawrence Smith, Canton, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 13/039,419

(22) Filed: Mar. 3, 2011

(65) Prior Publication Data

US 2012/0226622 A1  Sep. 6, 2012

(51) Int. Cl.
  *G06F 16/9535* (2019.01)
  *G06F 16/9537* (2019.01)

(52) U.S. Cl.
  CPC ...... *G06F 16/9535* (2019.01); *G06F 16/9537* (2019.01)

(58) Field of Classification Search
  USPC .......................................................... 705/319
  See application file for complete search history.

(56) References Cited

U.S. PATENT DOCUMENTS

| 8,229,458 | B2 * | 7/2012 | Busch | 455/456.1 |
| 2005/0048987 | A1 * | 3/2005 | Glass | H04M 1/72544 455/456.1 |
| 2006/0052115 | A1 * | 3/2006 | Khushu | G01S 5/0263 455/456.3 |
| 2008/0032706 | A1 * | 2/2008 | Sheynblat | G01S 5/0036 455/456.1 |
| 2008/0104227 | A1 * | 5/2008 | Birnie | H04L 67/24 709/224 |
| 2009/0088180 | A1 * | 4/2009 | LaMance | G01S 5/14 455/456.1 |
| 2010/0088246 | A1 * | 4/2010 | Lim | 705/319 |
| 2010/0198742 | A1 * | 8/2010 | Chang et al. | 705/319 |
| 2010/0312714 | A1 * | 12/2010 | Ourega | 705/319 |
| 2011/0205125 | A1 * | 8/2011 | Lin | G01S 5/0236 342/451 |

OTHER PUBLICATIONS

"Location-Aware Networking: We Know Where You Are: LAN Strategies & . . . " Greenfield, David Network magazine; Mar. 2005; 20, 3; ProQuest p. 46 (Year: 2005).*

* cited by examiner

*Primary Examiner* — Andrew B Whitaker
(74) *Attorney, Agent, or Firm* — Merchant & Gould P.C.

(57) ABSTRACT

A method and a system for providing location and profile based system and services. A system may includes a plurality of data sources disposed within a network for providing location and identity information associated with objects disposed within the network and a concentrator bridge, operatively coupled to the plurality of data sources, the concentrator bridge including a receiver associated with each of the plurality of data sources, wherein the concentrator bridge receives location and profile data associated with the objects from the plurality of data sources and provides the identity and location of the objects disposed within the network for viewing on a user interface.

23 Claims, 9 Drawing Sheets

LOCATION AND PROFILE BASED SYSTEM AND SERVICE

FIELD OF THE INVENTION

This disclosure relates in general to services and systems that use location-based technology, and more particularly to a method and a system for providing location and profile based system and services.

BACKGROUND

Large retail operations face enormous challenges tracking inventory and preventing errors while ensuring products are correctly stored in the proper location in their warehouses. In most warehouse settings, the movement of pallets as part of shipping, receiving, inventory, and warehouse management is an integral part of the business operations. On any given day, hundreds of pallets can come in and go out of large distribution centers. It is not always easy to accurately identify the pallet and its contents or to assign the pallet to the proper location in the warehouse and record that location correctly. Such warehouse inventory inaccuracies can cause a number of inefficiencies.

Besides inventory, today's fleet managers are faced with new challenges posed by government mandates and private-sector goals that include reducing petroleum use, reducing greenhouse gas (GHG) emissions, and complying with alternative-fuel mandates. Choosing the right technologies to reach these goals is a complex process that requires an understanding of the technological landscape in addition to the makeup and operational requirements of each fleet. Furthermore, in a challenging economy, managing a fleet efficiently is more important than ever to reduce costs and improve fleet utilization. Virtually every successful organization relies on fleets and mobile workforces—from transportation companies and manufacturing enterprises with field engineers, to retail companies providing home deliveries, to local governments tracking city service and emergency vehicles and personnel.

In the current market many game developers are ignoring the exciting new possibilities cellular phones and other personal devices provide via their inherent ability to maintain connectivity while on the move. One possibility is to extend the virtual world of traditional video games through location-based information, which allows users to play games that incorporate knowledge of their physical location and landscape, and then provides them with the ability to interact with both real and virtual objects within that space.

The above applications present many new possibilities for location and identification system and services. However, currently there is no accurate method to quickly and easily identify people or interactive agents or objects in a campus environment, in a large building, in crowded meeting places, in a conference room, or walking outside your building. Several applications have been developed that expand on the ubiquitous GPS technology. Such application individually may provide some aspects of location and identification services. Some examples include Xobni for integrated search, Google Latitude for GPS tracking, and 4 Square for location based recommendations. Second Life and other virtual games use a similar user interface for virtual environments. GPS, Wi-Fi, and similar technologies are limited to providing rough location parameters. The newest Wi-Fi systems provide better locating capability that can narrow a location down to 20 to 30 meters.

However, that is still way too rough for identifying people that are sitting in a crowded space. In addition, accurately locating agents or objects, other than people, presents the same dilemma.

SUMMARY OF THE INVENTION

To overcome the limitations described above, and to overcome other limitations that will become apparent upon reading and understanding the present specification, embodiments for a method and a system for providing location and profile based system and services are disclosed.

The above-described problems are solved by enabling subscribers of a communication system to quickly and precisely locate people and verify their identity based on a combination of a location determination, identity parameters, and a presence provided by a converged services operator. Two classes of location based services are provided: a) high-resolution people location and identification, and b) location based social networking by looking at publicly available profiles of people or objects in your physical locale. Therefore, an accurate location of a person or object is determined using different methods and publicly available information is accessed, processed and used to satisfy a predefined use case.

An embodiment includes a system for providing location and profile based services. The system includes a plurality of data sources disposed within a network for providing location and identity information associated with objects disposed within the network and a concentrator bridge, operatively coupled to the plurality of data sources, the concentrator bridge including a receiver associated with each of the plurality of data sources, wherein the concentrator bridge receives location and profile data associated with the objects from the plurality of data sources and provides the identity and location of the objects disposed within the network for viewing on a user interface.

In another embodiment, a personal device for utilizing location and profile based services is provided. The personal device includes memory for storing data and a processor, coupled to the memory, for receiving identification and location information from a concentrator bridge and displaying the received identification and location information.

In another embodiment, a method for providing location and profile services is provided. The method includes registering an object with a communication service provider, providing the registered object with a core identity, maintaining a database of registered objects, receiving location and profile information associated with registered objects disposed within a network of the communication service provider, processing the received location and profile information to determine a location, identity and profile for registered objects and providing the determined location, identity and profile for registered objects to a user and displaying the determined location, identity and profile for registered objects on a map to enable the user to locate a desired object within the network.

In another embodiment, a computer readable medium is provided including executable instructions which, when executed by a processor, provides location and profile services. The location and profile services include registering an object with a communication service provider, providing the registered object with a core identity, maintaining a database of registered objects, receiving location and profile information associated with registered objects disposed within a network of the communication service provider, processing the received location and profile information to determine a location, identity and profile for registered objects and providing the determined location, identity and profile for registered objects to a user and displaying the determined location, identity and profile for registered objects on a map to enable the user to locate a desired object within the network.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed to a method and a system whereby subscribers of a communication system can quickly and precisely locate people and verify their identity based on a combination of a location determination, identity parameters, and a presence provided by a converged services operator. Two classes of location based services are provided: a) high-resolution people location and identification, and b) location based social networking by looking at publicly available profiles of people or objects in your physical locale. Therefore, an accurate location of a person or object is determined using different methods and publicly available information is accessed, processed and used to satisfy a predefined use case.

Figure 1:
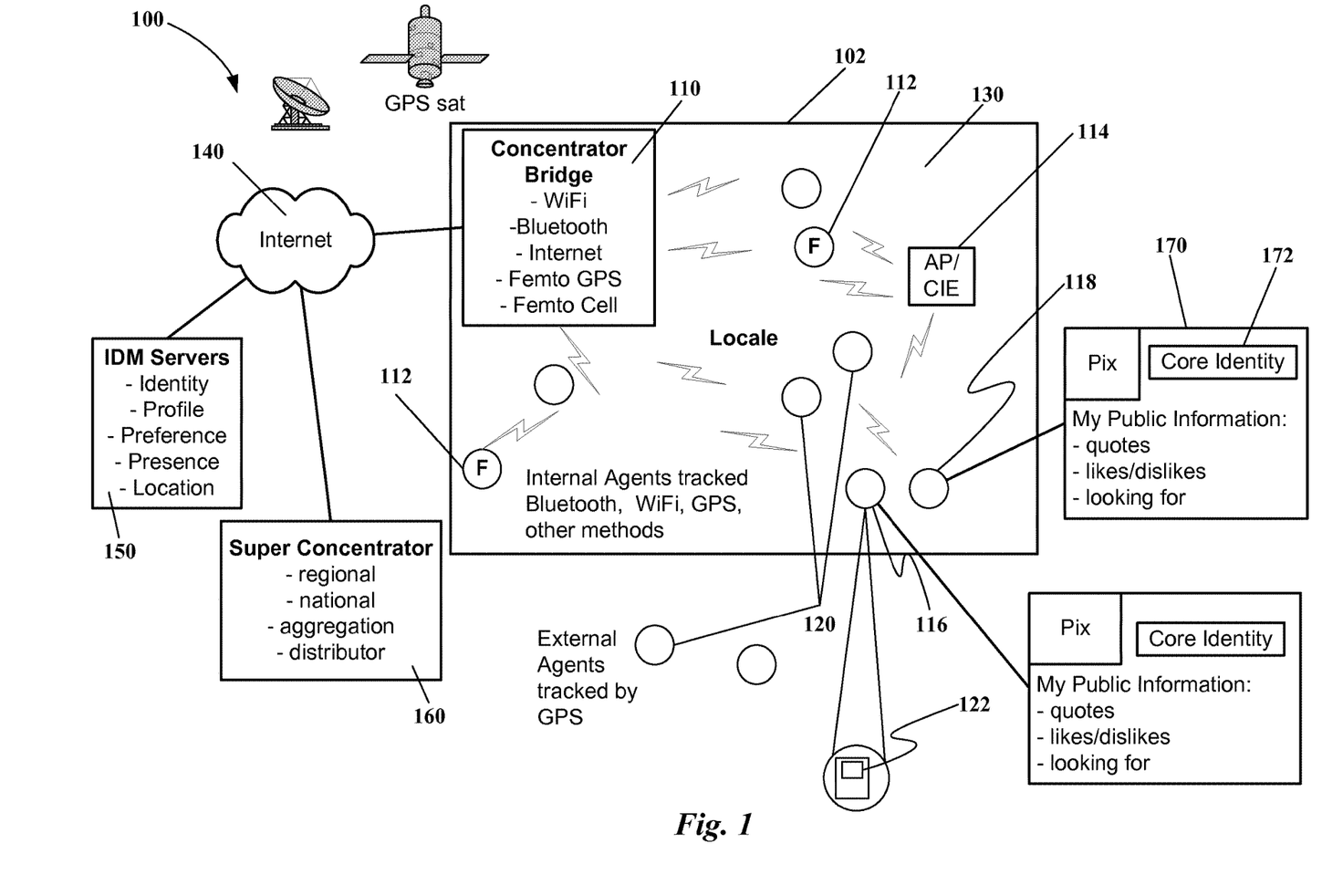
FIG. 1 shows the method and system for providing the precise location of an entity in a physical locale based on a combination of location, identity, and presence provided by a service operator according to one embodiment.

FIG. 1 shows methods and systems for providing the precise location of an entity in a physical locale 100 based on a combination of location, identity, and presence provided by a service operator according to one embodiment. In FIG. 1, a networked concentrator bridge 110 is provided within the network 102. The networked concentrator bridge gathers location and identification data from registered users identified within the range of the network 102. By aggregating data and information obtained from one or more networked concentrator bridges 110, a 3-dimensional (3-D) map of entities at a location may be developed. For example, an entire building can be composed, including absolute position and relative height and multiple buildings may be networked into a campus. Femtocells 112 are disposed within the network 112. Additional access points or communication infrastructure entities 114 may also be disposed within the network, such as Bluetooth receivers, WiFi access points, etc.

Each user has a personal device 120 that is configured to receive and/or provide identification and location information and to display such information. The personal devices 120 allow the system to provide precise location of an entity in a physical locale 130 within the network 102. While the concentrator bridge may be configured to receive the information from the personal devices 120, aggregation of information may be performed by the concentrator bridge or at a back-office 150. The networking can be extended to the cloud 140 to enable regional or even national aggregation via a super concentrator 160. The concentrator network, including super concentrator 160, communicates with IDM system (identity management servers) 150 from various identity service providers over the Internet 140 using secure channels.

More specifically, a first user 116 has a personal device that is tracking the location of the first user 116 within the network 102. A second user 118 has a second personal device and is also being tracked within the network 102. Each personal device of users 116, 118 maintains profile information 170 concerning the user. Every subscriber 116, 118 has a core identity 172 provided by the system provider with a certain set of preferences/profiles that include attributes associated with the core identity 172. The system provider maintains a database, for example, at the IDM servers 150, for storing the profiles and attributes associated with the core identity 172 of a user. The system 100 is capable of searching outside the backend system for additional types of information, e.g., Facebook, MySpace, etc that is aggregated to develop a unified representation of a subscriber.

Through a registration process, the core identity 172 is associated with a device of a registered user. Once the core identity 172 and location for an object or person has been identified, the preferences, profile, etc. are extrapolated into a larger database of extended profile information from third party identity systems.

The second user 118 may be using a personal device provided by a provider that is different from the provider of the location and profile based system and service. However, the second user 118 may also register with the provider of the location and profile based system and service. For example, a cell phone associated with one provider may be associated with an account for different services. If the user is a subscriber to cable services offered by the provider of the location and profile based system and service, the registration process may be streamlined.

At least one of the personal devices 116, 118 includes a map user interface 122 that is displayed on the device. Network concentrators report back through the cloud 140 to a set of application servers 150 at the back-office system. Third party profile services may then be accessed to obtain additional information concerning users 116, 118.

Data is aggregated at a predetermined location and then the aggregated information is displayed on the personal device of a user 116 via the map user interface 122. The logical representation may be simply providing a display of dots on an XYZ plane. Thus, the first user 116 may use the map user interface 122 of the personal device to ascertain where the second user 118 is located. The first user 116 may further select the second user 118 on the device display to determine the identity and other information concerning the entity/person located on the display.

Therefore, a personal device of a user 116, 118 according to one embodiment receives information and presents such information for locating and identifying other users. Users may quickly scan multi-building campus views and then focus on a single building or a particular room within the building. Entity representations, e.g., dots displayed on a map, may be displayed in a manner to represent different types of agents. As a user zooms in closer using the map user interface 122, additional information concerning other users may be provided, such as the names, profile information and basic location parameters.

Figure 2:
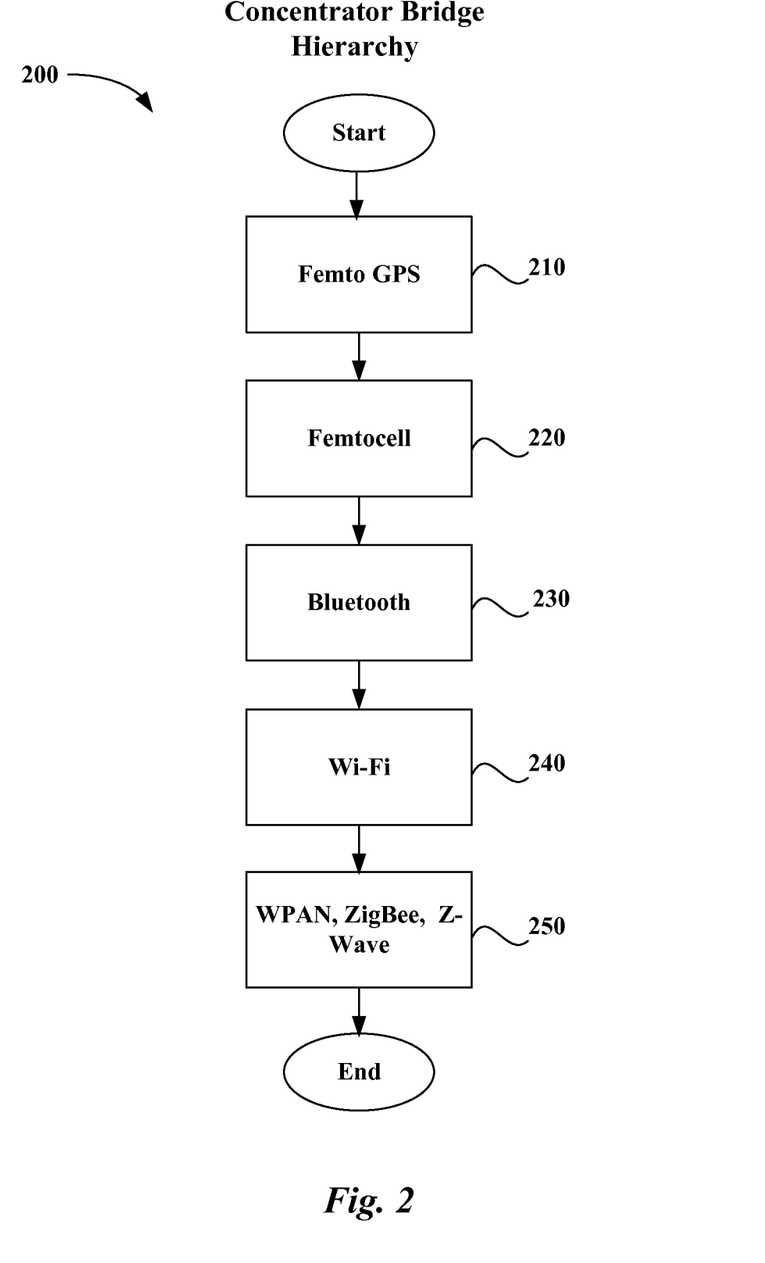
FIG. 2 shows the concentrator bridge locator hierarchy which is the heart of the location and profile based system according to one embodiment.

FIG. 2 shows the concentrator bridge locator hierarchy 200 which is the heart of the location and profile based system according to one embodiment. The concentrator bridge 200 contains a variety of receivers and detectors. First, a Femto GPS 210, a low-power GPS satellite emulator, is capable of providing a very high resolution that discriminates location to at least one foot. Standard GPS receivers would identify the GPS satellite emulator as a satellite and resolve location to the GPS satellite emulator. This kind of resolution is required to be able to detect people sitting close together, either standing or sitting down, for example at a table. Second, a Femtocell 220 is a low power cell phone tower emulator that is able to establish a connection with a cell phone. Cell phone connectivity from the Femto cell 220 can be used as a second order locator, say determining location to 20-15 feet from the transmitter. Third, Bluetooth connectivity 230 can be used as another close proximity identifier. However Bluetooth, designed as a cable replacement method is more difficult to configure and use in general. Fourth, Wi-Fi 240 or IEEE 802.16 WiMAX connectivity can also be used as a second order location estimator. Wi-Fi 240, depending on the type, signal strength and antenna configuration can be used to determine location within 300 feet of the transceiver. Fifth, home networking technologies such as ZigBee, IEEE 802.15 (WPAN), or Z-Wave can be used to determine or supplement the location. The concentrator bridge aggregates and combines the received signals and determines the specific location of an individual using various location determining algorithms such as successive approximation and triangulation, including multi-band cell phone triangulation methods. Thus, the concentrator bridge provides a layered hierarchy of systems for determining location, wherein one or more of the location technologies are used to determine the location of a subscriber.

Figure 3:
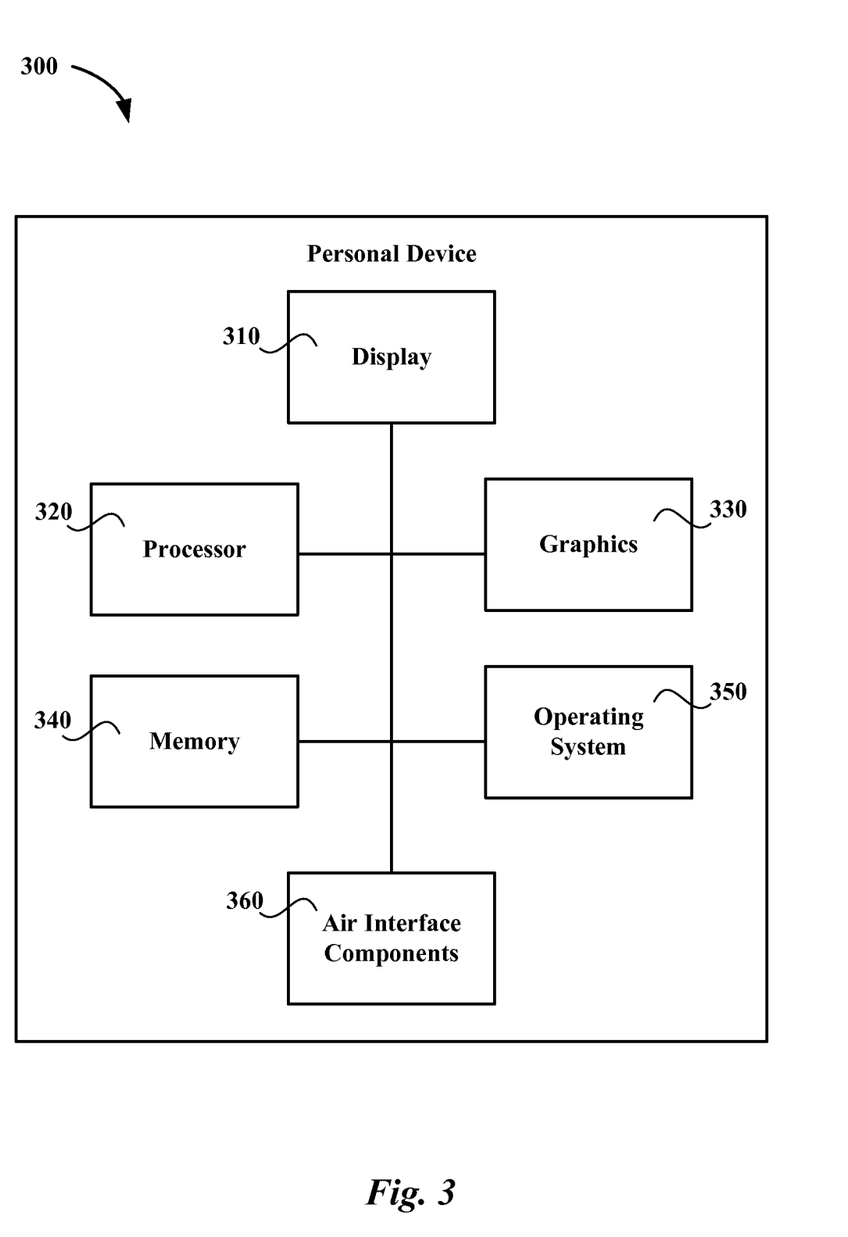
FIG. 3 illustrates the personal device that is carried by the user according to one embodiment.

FIG. 3 illustrates the personal device 300 that is carried by the user according to one embodiment. The personal device 300 is a handheld device such as a smart phone or a portable computing device that is typically kept in the user's personal space and therefore can be considered to be a reliable indicator of location and presence. The personal device 300 may also be a mechanism that is attached to something other than a human user, i.e., a pallet of products, cattle, vehicles, construction equipment, etc. The device may be configured with a general purpose computing environment, including a display 310, processor 320, high resolution graphics 330, memory 340, and operating system 350. The devices are configured to contain the various air interface components 360 used to expose location to the Concentrator Bridge, the detection mechanism. The air interface components 360 may also receive information, such as position vectors to update position information as such information changes. As mentioned above, such air interface components 360 may include a GPS receiver, GSM or CDMA cell phone transceiver, Bluetooth, and Wi-Fi. Thus, the personal device 300 can represent a person, an object, or an entity as shown in the user interface application section.

Figure 4:
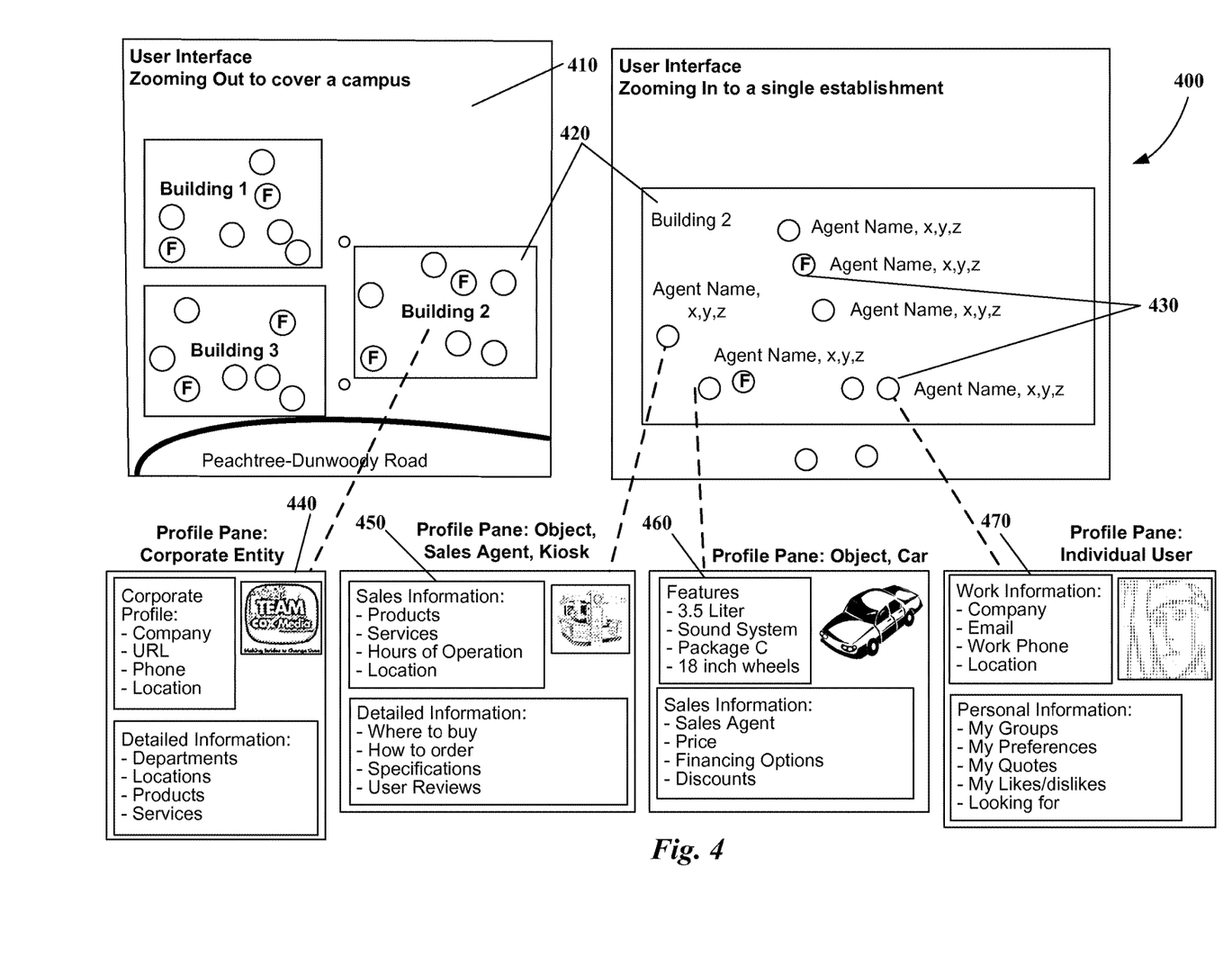
FIG. 4 illustrates the user interface application in a campus environment according to one embodiment wherein several buildings are included and one of the entities is a corporation.

FIG. 4 illustrates the user interface application in a campus environment 400 according to one embodiment wherein several buildings are included and one of the entities is a corporation. Zoom levels enable the user to quickly scan from a multi-building campus view 410 to a single entity, Building 2 420. Agent dots 430 that can be color coded to indicate which persons are friends or have some other shared property. Color can also be used to represent agent type, for example "object" agents and corporate entities in a multi-tenant building can be depicted in different colors. As the cursor rolls over an agent dot 430, the name and XYZ coordinates of the agent are displayed. Clicking or otherwise selecting a single dot opens profile panes 440-470. So when the subscriber selects the corporate entity Building 2 420 displayed on the map, the user profile pane 440 for the selected entity is displayed. The Corporate entity profile pane 440 shows company information including a corporate profile 442 and details on products and services. The sales agent, kiosk profile pane 450 shows basic sales information 452 as well as detailed information 454 about the product and services. The car profile pane 460 reveals information about the car features 462 and sales information 464. The individual profile pane 470 provides work information 472 and personal information 474 about the selected person. The profile panes 440, 450, 460, 470 display a photo or other graphical information to identify the entity. The profile panes 440, 450, 460, 470 also provide other public information available. All profile panes 440, 450, 460, 470 can also replace a static photo with a streaming video for a product or service, a "how to get there" video, or even a discount barcode in the commercial environment. Furthermore, as mentioned above, position vectors may be received to update position information on a display.

Figure 5:
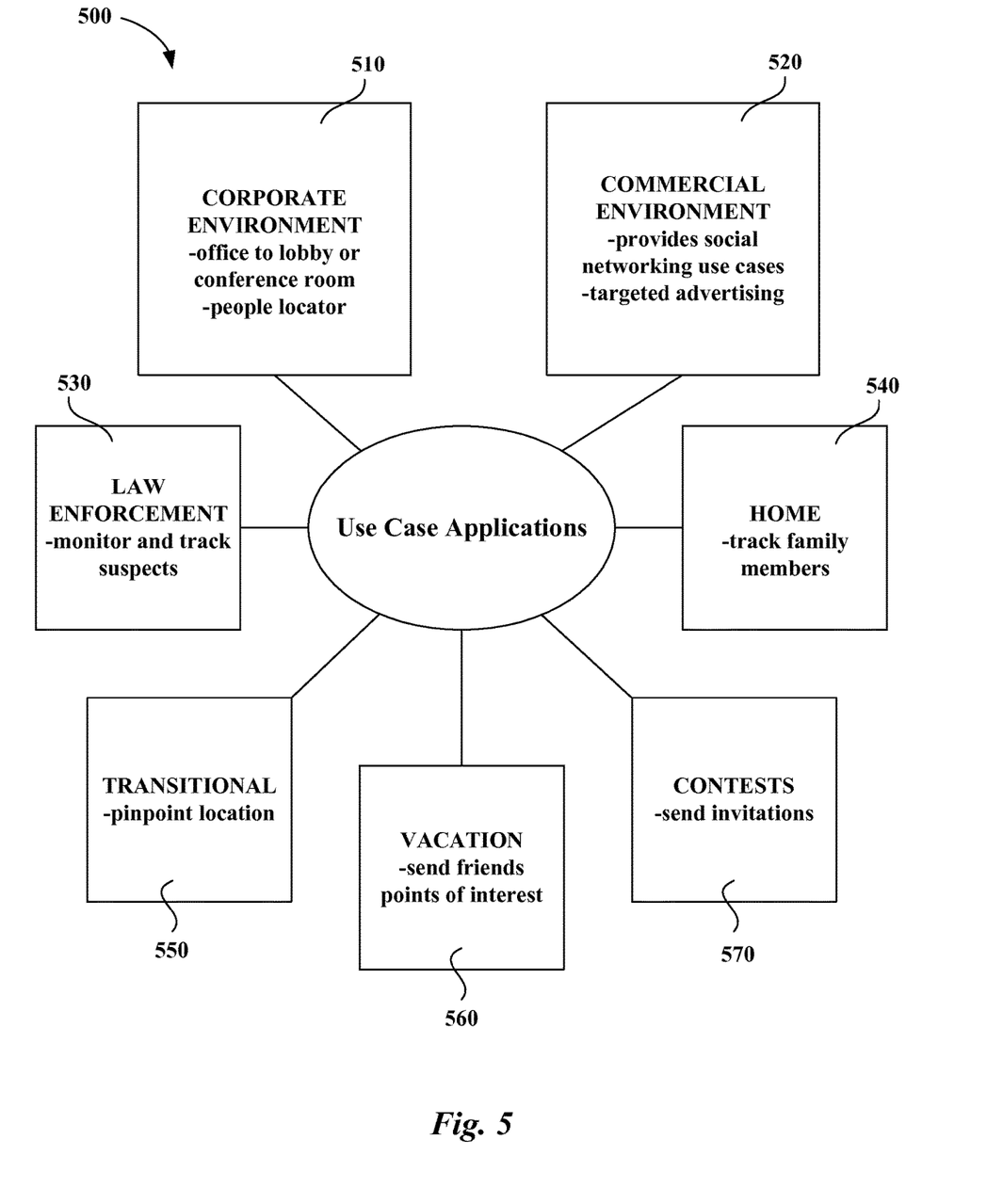
FIG. 5 shows several application use case categories according to one embodiment.

FIG. 5 shows several categories of application use cases 500 according to one embodiment. The locator system can be beneficial to the corporate environment 510. A worker can see the people in the lobby from his office, so he can check to see whether his scheduled interviewee has arrived for example. A worker can also see the people in a conference room. As a people locator, a worker can easily locate other workers in the work environment without having to ask administrators or physically traverse the hallways looking for offices.

The commercial environment 520 provides the social networking use cases. For example, in a bar, a user can see the public profiles of all the people in the establishment and strike conversation, either in person, or via instant messaging with those he finds interesting. The establishment may (with user permission) display the user's public profile on a large screen for all to see. In a church or music venue, a user can see the public profiles of all the people in the establishment and by looking at the exposed groups of other users he may find groups he may be interested in joining Targeted advertising in a shopping environment will be possible in which recommendations and ads based on profile, preferences, location, and previous transaction history can be displayed to the user. For example, when a user brings a registered device into a store having location services, the store may be provided with information showing where the user spent time during the visit to the store. Thus, the store may send a coupon or special offer to the user based on the location and identity data associated with the user. Because of privacy issues, such access to information may be opted out of by the user. Different objects within the locale may also have registered devices to allow information regarding the relative position of the user to the registered devices. For example, a specific vehicle may have a registered device associated with it and the user is observed to spend a majority of the time proximate to that vehicle. This information may be provided to a sales agent to enable the sales agent to infer interest by the user in the vehicle, to follow-up with the user, to provide special offers, rebates, discounts, etc. to the user to entice the user to return to the showroom floor.

Law enforcement 530 can use the system to monitor and track suspects. The system can be used in the home environment 540 for tracking family members for safety or due to concerns about health, e.g. diabetics. In the transitional environment 550, a user can grant temporary authorization for a taxi driver to pinpoint his/her location. Other use case examples include vacation 560 to bookmark exact location of points of interest and send to friends, and contests 570 to invite friends to an event, meeting place, or after hour party.

Figure 6:
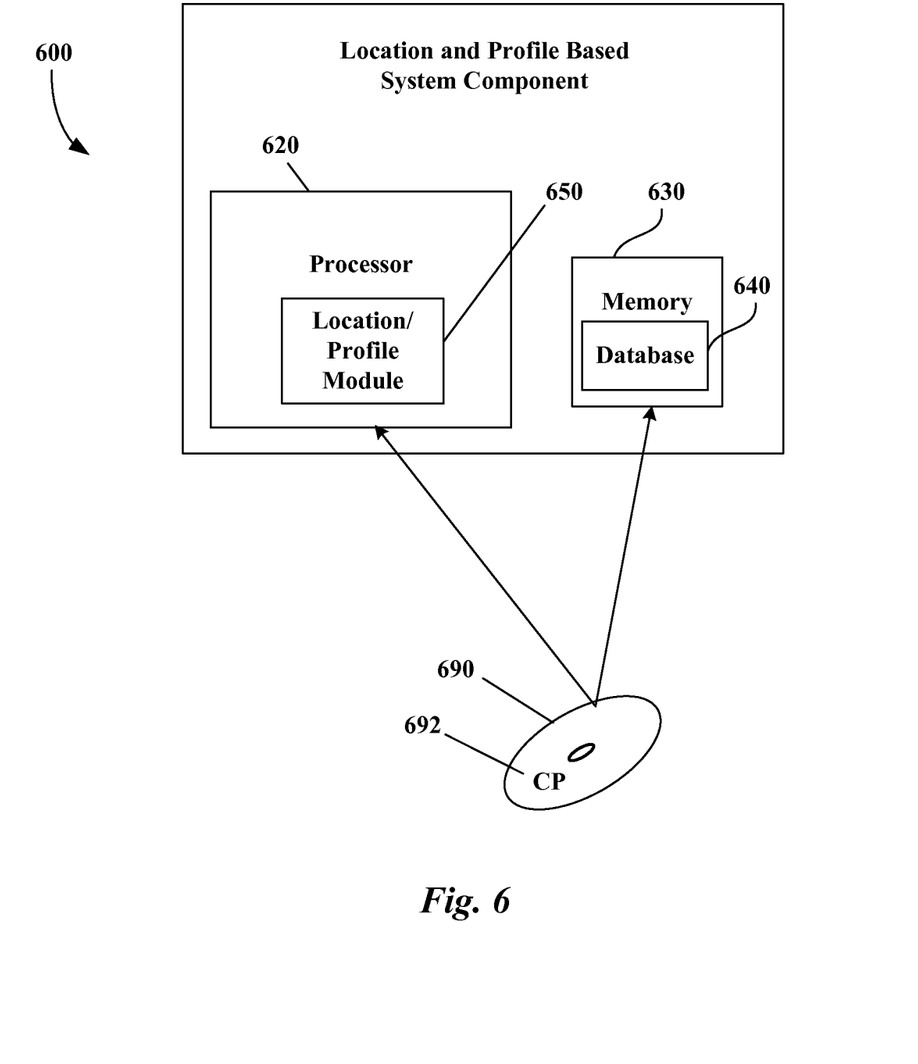
FIG. 6 illustrates a suitable computing environment for implementing at least a portion of a location and profile based system and service as described above in FIGS. 1-5 according to an embodiment.

FIG. 6 illustrates a suitable computing environment 600 for implementing at least a portion of a location and profile based system and service as described above in FIGS. 1-5 according to an embodiment. In FIG. 6, a component of a location and profile based system and service 600 includes a processor 620 and memory 630. Those skilled in the art will recognize that the component of a location and profile based system and service 600 may be a personal device of a user, a concentrator bridge, or other processing device used to provide functions associated with location and profile based system and services. Embodiments may also be implemented in combination with other types of computer systems and program modules. Generally, program modules include routines, programs, components, data structures, and other types of structures that perform particular tasks or implement particular abstract data types.

By way of example, computer readable media 690 can include computer storage media or other tangible media. Computer storage media 690 includes volatile and nonvolatile, removable and non-removable media implemented in any method or technology for storage of information 692, such as computer readable instructions, data structures, program modules or other data. Moreover, those skilled in the art will appreciate that the invention may be practiced with other computer system configurations, including handheld devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable media 690 may refer to a mass storage device, such as a hard disk or CD-ROM drive. However, it should be appreciated by those skilled in the art that computer-readable media can be any available media that can be accessed or utilized by a processing device, e.g., personal media device, cellphone, server or communications network provider infrastructure.

By way of further example, and not limitation, computer-readable media 690 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules and data files may be stored and arranged for controlling the operation of processing devices. Thus, one or more processing devices 620 may be configured to execute instructions that perform the operations of embodiments of the present invention.

It should also be appreciated that various embodiments of the present invention can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Memory 630 thus may store the computer-executable instructions that, when executed by processor 620, cause the processor 620 to implement a component of a location and profile based system and service 600 as illustrated above in FIGS. 1-5 according to an embodiment of the invention. Processor 620 may implement a location/profile module for implementing functions of the location and profile based system and services. Memory 630 may also be configured to provide the database 640 for storing the quality information provided by users of the system and other system information, which is processed by processor 620.

Figure 7:
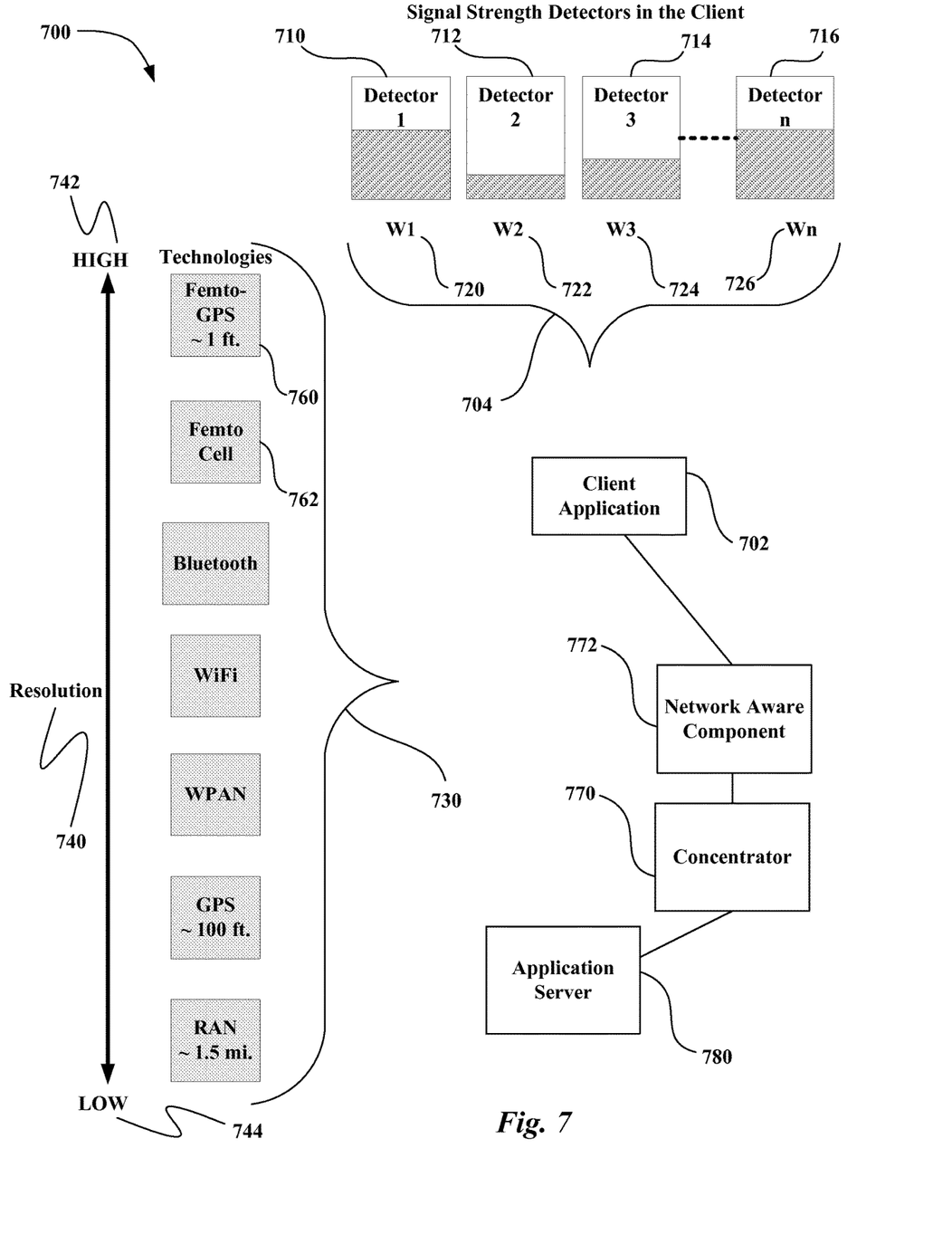
FIG. 7 illustrates a system of detectors that are processed by the concentrator for determining which signals to evaluate when resolving the absolute location of a target.

FIG. 7 illustrates a system of detectors 700 that are processed by the concentrator for determining which signals to evaluate when resolving the absolute location of a target. A client application 702 determines the desired resolution by using the zoom level. In FIG. 7, detectors 710, 712, 714, 716 are shown for detecting signal strength for determining device locations. Client application 702 may select (large campus, single building, room in a building) as well as weights 704 for each of the signal strength detectors 710, 712, 714, 716 that are used in making the location determination. For example, in FIG. 7 weight, W1 720, W2 722, W3 724, Wn 726 are assigned for each of the signal strength detectors 710, 712, 714, 716 used in making the location determination. The client application 710 may be looking for a device in a multi-building complex. FIG. 7 shows a list of different technologies 730 that may be used for providing measurement of signal strength. The different technologies 730 are listed in order of their resolution 740 from a technology having a high resolution 742 to a technology having a low resolution 744. When looking for a device in a multi-building complex, the use of femto GPS 760 or femto-cell 762 may not be desired. Thus, the client application 702 may assign a low weighting factor to detectors providing signal strength signals for the femto GPS 760 or femto-cell 762. The client application 702 may refer to a comparison of the resolution 740 and technology 730 as shown in FIG. 7 to select the technologies that best provide the desired resolution for a particular use case.

The client application 702 then communicates the request for location based services to an application server 780. The application server 780 may be part of large grid of servers in the data center of the service provider. The application server 780 initiates the session. Throughout the duration of the session, the client application 702 continues to send location and signal strength data to the application server 780.

The application server 780 aggregates the information being relayed by the client over a preferred communication path. The information is relayed by a concentrator 770 and any network aware components 772, such as those in the RAN, to construct the location profile. The application server 780 continuously transmits the location vector and any related information to the client application 702 until the session ends.

Figure 8:
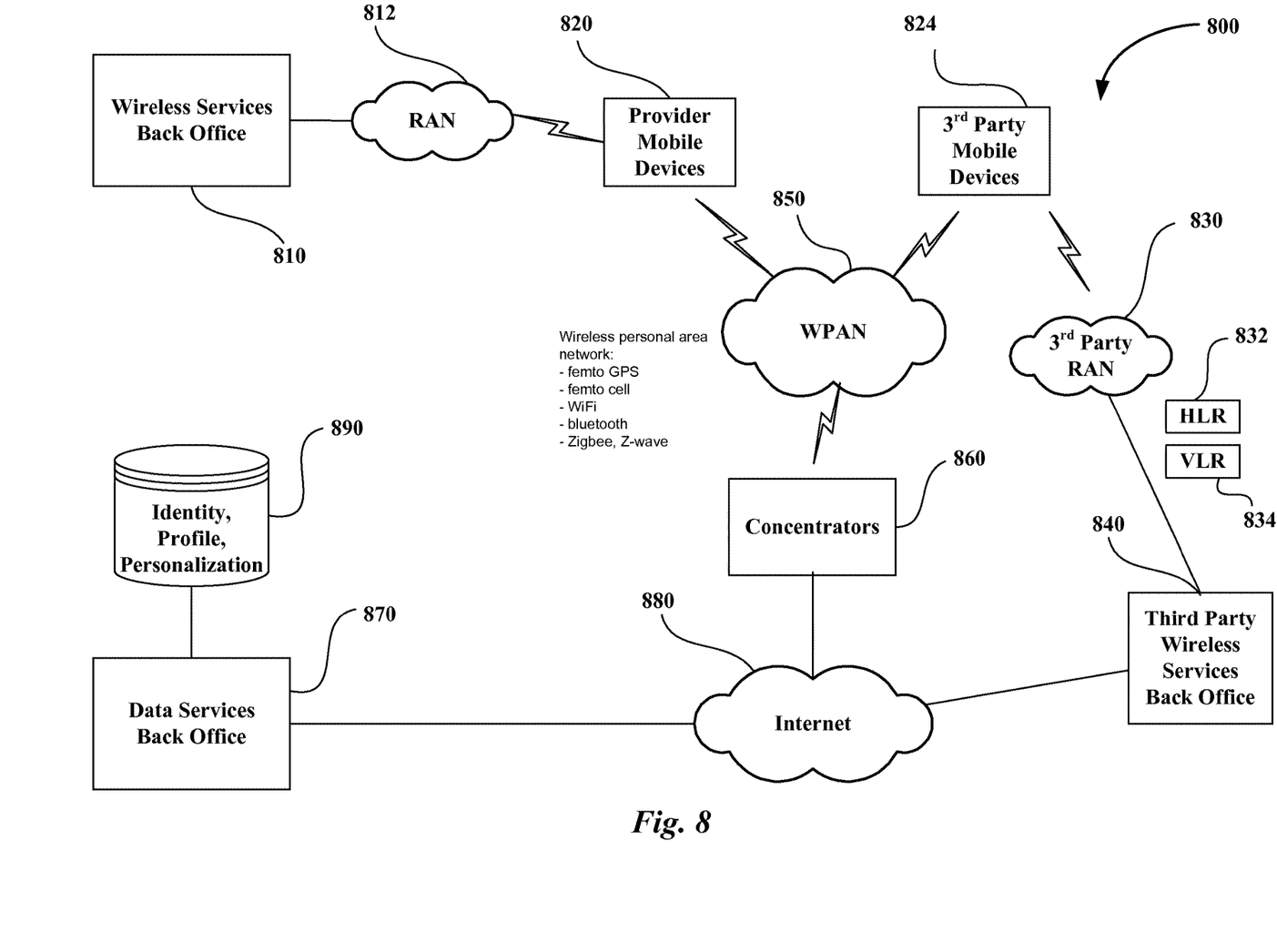
FIG. 8 illustrate a network topology according to an embodiment.

FIG. 8 illustrates a network topology 800 according to an embodiment. In FIG. 8, a provider backoffice 810 is coupled to a radio access network (RAN) 812. The RAN 812 communicates with a mobile device 820 associated with the provider. Mobile device 824 is associated with a third party provider and communicates with third party RAN 830. Third party RAN 830 communicates with third party wireless services backoffice 840. The RANs 812, 830 manage access, roaming, transparent connection to the respective backoffices. For example, mobile device 824 is supported by the third party HLR (Home Location Register) 832, which is a database of subscriber information that is used to handle services for the mobile device 824. If the mobile device 824 is not in its home area, a VLR (Visitor Location Register) 834 obtains the necessary information for supporting the mobile device 824.

Mobile device 820 associated with the provider and mobile device 824 associated with the third party may access the wireless personal network 850. Concentrators 860 gather information from the mobile devices 820, 824 and access the provider data services backoffice 870 via the Internet 880. The third party wireless services backoffice 840 may also be coupled to the Internet 880.

The concentrators 860 are networked either on private local area networks to cover a single building or over the Internet 880, as shown in FIG. 8, to cover a larger area. A mix of mobile devices 820, 824 may be present in the location covered by the wireless personal network 850 coupled to concentrators 860. Each of the mobile devices 820, 824 report to their respective backoffice 810, 840. When the location service is being provided by the provider from the data services backoffice 870, the provider aggregates data from all the devices in the field, including concentrators 860 and mobile devices 820, 824. The backoffice 870 then associates this information with identity, profile, and personalization information from the Identity Management (IM) system 890. The wireless personal area network 850 is established between the concentrators 860 and the mobile devices 820, 824.

Figure 9:
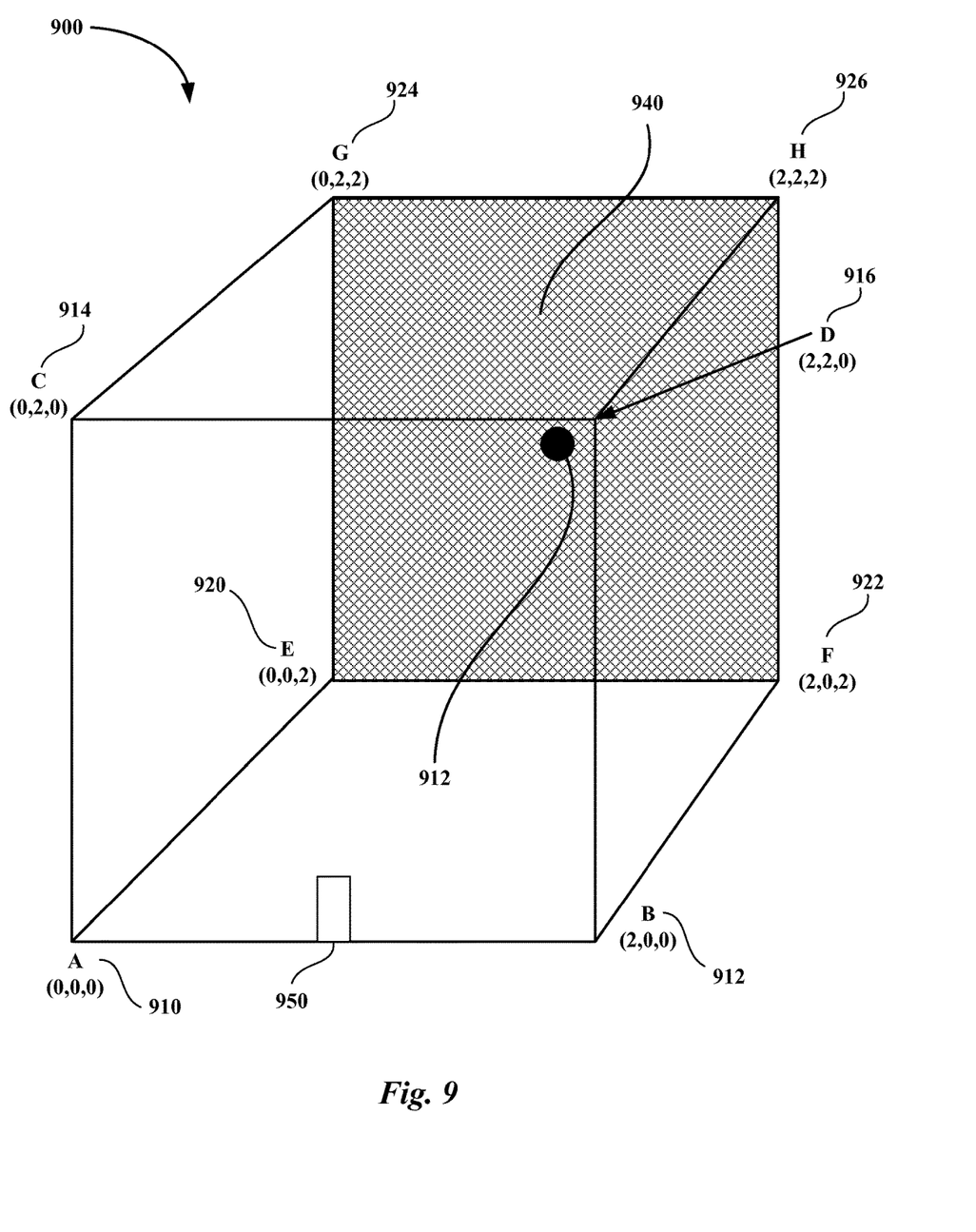
FIG. 9 illustrates a building having access points dispersed throughout for allowing the use of signal strength to locate a device according to an embodiment.

FIG. 9 illustrates a building 900 having access points dispersed throughout for allowing the use of signal strength to locate a device according to an embodiment. A single technology may be used to implement the signal strength location according to an embodiment. In FIG. 9, access points 910-926, such as a WiFi access point, are installed in each corner of the building 900. Each access point 910-926 is calibrated to output equivalent signal energy. A three dimensional location map of the building can then be constructed based on the detected signal strengths received by a device. For example, a receiver in the middle of the EFGH plane 940 of the building 900 will see equal signal strength from access points E 920, F 922, G 924, and H 926 and lower signal strengths from the other access points 910-916. A receiver in the middle of the building will see equal signal strength from all access points 910-926. A receiver at the entrance of the building, e.g., ground floor (1,0,0) 950, will see the highest signal from access points A 910 and B 912. A receiver can be provisioned by the mobile application to disregard all access points not associated with the building The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system for improving a network by providing location and profile based services to a mobile device to enable the mobile device to locate and identify objects connected to the network, comprising:

a plurality of data sources, each data source being associated with an object disposed within an environment, each of the data sources transmitting a signal for providing identity information associated with objects disposed within the environment;

a concentrator bridge, operatively coupled to the plurality of data sources, the concentrator bridge including a plurality of receivers to communicate with each of the plurality of data sources, the plurality of receivers being at locations dispersed throughout the environment, the location for each of the objects being determined by each of the plurality of receivers based on signal strength measurements according to different layers of a hierarchy of connectivity that includes the plurality of receivers in an ordered list from a high resolution to a low resolution, wherein the concentrator bridge aggregates and combines the signal strength measurements made by the plurality of receivers and communicates the identity and location of each object relative to the mobile device, and wherein the location of each object is based on aggregated signal strength measurements from different data sources of the plurality of data sources in order to depict the location of each object on the mobile device; and a user interface displayed on the mobile device wherein a three dimensional location map is constructed based on the signal strength measurements received by the mobile device, wherein the signal strength measurements of at least one data source is used to depict at least one object in the three-dimensional location map; and wherein the concentrator bridge processes the plurality of receivers to determine which signals to evaluate when determining the location for each object by determining a resolution ranging from the high resolution to the low resolution for a zoom level ranging between a multiple building view to a room within a building view, and selecting one or more receivers from the plurality of receivers based on a weight assigned to each receiver in the plurality of receivers, and wherein the weight is assigned by comparing the determined resolution and the technology of the receiver to select an optimal receiver to provide the determined resolution based on the technology of the receiver, and wherein a lower weight is assigned to receivers with a higher resolution for the multiple building view zoom level.

2. The system of claim 1, wherein the identity and location of each object disposed within the network is determined by the concentrator bridge.

3. The system of claim 1, wherein the identity and location of each object disposed within the network is determined by a backend system and provided to the concentrator bridge for routing to the mobile device having the user interface for viewing the location and identity information.

4. The system of claim 3, wherein the backend system includes an identity management system.

5. The system of claim 4, wherein the identity management system includes a database for storing the profiles and attributes associated with a core identity of a user.

6. The system of claim 4, wherein the identity management system searches databases outside the backend system for additional types of information associated with each object disposed within the network, the identity management system aggregating information associated with the object and developing a unified representation of each object.

7. The system of claim 3, wherein the databases outside the backend system includes a social network.

8. The system of claim 3, wherein the identity management system provides a registration process to associate a core identity with a device of a registered user.

9. The system of claim 3, wherein the backend system includes a super concentrator for aggregating identity and location information.

10. The system of claim 9, wherein the super concentrator extrapolates preferences and profile information into a larger database of extended profile information obtained from third party identity systems.

11. The system of claim 3, wherein the backend system includes a concentrator network and identity management system, wherein the concentrator network is configured to communicate with the identity management system to collect data obtained by the identity management system from various identity service providers over the Internet.

12. The system of claim 1, wherein the plurality of receivers includes at least one selected from the group consisting of a femto global positioning system receiver, a low-power global positioning system satellite emulator, a standard global positioning system receiver, a Bluetooth receiver, a Wi-Fi receiver, a 802.16 receiver, and a home networking receiver.

13. The system of claim 1, wherein the location and identity information is associated with a registered object within the range of the network.

14. The system of claim 13, wherein the registered object is registered users.

15. The system of claim 13, wherein the registered object is a non-human object.

16. The system of claim 1, wherein the user interface comprises a personal device having a display for viewing a map of entities associated with the identity and location provided by the concentrator bridge.

17. The system of claim 1, wherein the receivers defined according to the hierarchy of connectivity comprises multiple types of receivers that are configured to determine location information at varying distances.

18. The system of claim 1, wherein the ordered list includes a femto global positioning system receiver, a cell phone tower emulator, a Bluetooth receiver, a Wi-Fi receiver, and a wireless personal area network receiver.

19. The system of claim 1, wherein the concentrator bridge evaluates signals from the hierarchy of connectivity using a successive approximation algorithm.

20. The system of claim 1, wherein the at least one object depicted in the three-dimensional location map is an agent dot that is color coded to indicate a shared property.

21. A method for improving a network by providing location and profile services to a personal device to enable the personal device to locate and identify objects connected to the network, comprising:
registering an object with a communication service provider;
providing the registered object with a core identity;
maintaining a database of registered objects;
receiving identification information from each of the registered objects disposed within a network within a first environment provided by the communication service provider, the network including a plurality of receivers at dispersed locations for receiving the identification information, wherein the plurality of receivers are defined according to a hierarchy of connectivity that includes the plurality of receivers in an ordered list from a high resolution to a low resolution;
aggregating and combining the received identification information from each of the plurality of receivers to determine identities and profiles, and aggregating measurements of signal strength for each of the registered objects to determine locations of each of the registered objects based on different layers of the hierarchy of connectivity, wherein the location of each registered object is based on aggregated signal strength measurements from different receivers of the plurality of receivers in order to depict the location of each registered object on the personal device, and wherein the plurality of receivers are processed to determine which signals to evaluate when determining a location for each registered object by determining a resolution ranging from the high resolution to the low resolution for a zoom level ranging between a multiple building view to a room within a building view, and selecting one or more receivers from the plurality of receivers based on a weight assigned to each receiver, wherein the weight is assigned by comparing the determined resolution and the technology of the receiver to select an optimal receiver to provide the determined resolution based on the technology of the receiver, and wherein a lower weight is assigned to receivers with a higher resolution for the multiple building view zoom level;
providing the determined locations, identities, and profiles for each of the registered objects to the personal device; and
displaying the determined location relative to the personal device, identity, and profile for the registered objects on a map interface on the personal device to enable the user to locate a desired object.

22. A system for improving a network by providing location and profile based services to a mobile device to enable the mobile device to locate and identify objects connected to the network, comprising:
a processor;
a plurality of receivers in communication with the processor and distributed throughout an environment; and
a memory storage device including instructions that when executed by the processor enable the system to:
receive signal strength information of a plurality of mobile devices from the plurality of distributed receivers defined according to a hierarchy of connectivity having the plurality of receivers in an ordered list from a high resolution to a low resolution;

determine, based on an aggregation of signal strength information for each mobile device, positions of the mobile devices relative to each other for different layers of the hierarchy of connectivity wherein the position of each mobile device is based on aggregated signal strength measurements via different receivers in order to depict the position of each mobile device, and the plurality of receivers are processed to determine which signals to evaluate when determining the position of each mobile device by determining a resolution ranging from the high resolution to the low resolution for a zoom level ranging between a multiple building view to a room within a building view, and selecting one or more receivers from the plurality of receivers based on a weight assigned to the receiver, wherein the weight is assigned by comparing the determined resolution and the technology of the receiver to select an optimal receiver to provide the determined resolution based on the technology of the receiver, and a lower weight is assigned to receivers with a higher resolution for the multiple building view zoom level;

in response to a location request received from a first mobile device of the plurality of mobiles devices, the location request identifying a registered device of the plurality of mobiles devices within the environment, using the signal strength measurements via at least one receiver to construct a position vector; and transmit the position vector to the first mobile device for display thereon.

23. The system of claim 22, further comprising identify a position vector of the first mobile device relative to the registered device wherein the system is further configured to determine whether the relative positions of the mobile devices to each other have updated, and in response, transmit updates to the position vector to the first mobile device for display thereon.

* * * * *

UNITED STATES PATENT AND TRADEMARK OFFICE
CERTIFICATE OF CORRECTION

PATENT NO. : 10,621,247 B2
APPLICATION NO. : 13/039419
DATED : April 14, 2020
INVENTOR(S) : Francisco Gonzalez Page 1 of 1

It is certified that error appears in the above-identified patent and that said Letters Patent is hereby corrected as shown below:

In the Specification

Column 10, Line 9, "building" should read --building.--.

Signed and Sealed this
Twenty-second Day of December, 2020

Andrei Iancu
*Director of the United States Patent and Trademark Office*